May 8, 1928.

C. B. HALL 1,668,589

LAMP HOUSE AND FILM GATE CONSTRUCTION FOR MOTION PICTURE PROJECTORS

Filed May 7, 1923

Inventor:
Clarence B. Hall.
by Emery, Booth, Janney & Varney
Attys

Patented May 8, 1928.

1,668,589

UNITED STATES PATENT OFFICE.

CLARENCE B. HALL, OF WINTHROP, MASSACHUSETTS.

LAMP-HOUSE AND FILM-GATE CONSTRUCTION FOR MOTION-PICTURE PROJECTORS.

Application filed May 7, 1923. Serial No. 637,162.

This invention relates to a novel and improved lamp house and film gate construction for motion picture projectors. The invention will be best understood by reference to the following description, when taken in connection with the accompanying drawings of one specific embodiment thereof, while its scope will be more particularly pointed out in the appended claims.

Figure 1:
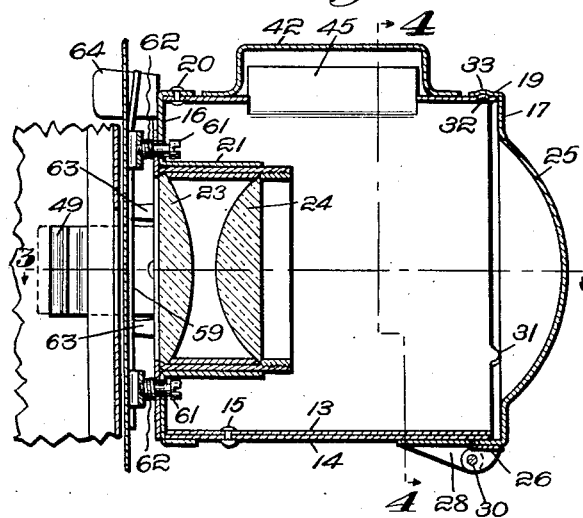
Fig. 1 is a vertical, longitudinal section of a lamp house and film gate construction exemplifying the invention.

Referring to the drawings, and to the embodiment of the invention which is selected for exemplification, there is shown (see Fig. 4) a light source comprising an incandescent lamp 6, having a filament 7 and a base 8, the latter being provided with two laterally projecting pins, one of which is shown at 9, received in bayonet slots, one of which is shown at 10, in a socket 11. The lamp is housed in a lamp house comprising a body 12, herein conveniently formed of a piece of sheet metal bent into generally cylindrical form, and having overlapping marginal portions 13 and 14, shown in the lower portion of Fig. 4, which are conveniently secured to each other, as by rivets 15. The ends of the lamp house body are closed by heads 16 and 17, herein provided with flanges 18 and 19, respectively, which are disposed about the body. The flange 18 is conveniently secured to the body by rivets, one of which is shown at 20 in Fig. 1. The head 16 is also provided with an inner annular flange 21, which affords a support for a centrally located lens tube 22, which serves as a mounting for condensing lenses 23 and 24, by means of which the light rays from the lamp are condensed and projected.

The other head 17 presents a concave reflector 25, which concentrates the light rays and projects them as a beam in the direction of the condensing lenses. The reflector is conveniently made by simply silver-plating the internal surface of the head and giving it a high polish. Access to the interior of the lamp house for the purpose of inspection and replacement of the lamp when necessary is accomplished in the present example by hinging the head 17 to the lamp house body 12, as by securing to the head a hinge piece 26 by rivets 27 (see Fig. 4), and by securing to the body of the house a hinge piece 28 by rivets 29 (see Fig. 3). The hinge pintle in the present example is a cotter pin 30 (see Fig. 4), which extends through ears provided on both hinge pieces. Closing movement of the hinged cover just described is limited at three points about the circumference of the lamp house body by lugs 31. This three-point contact is more desirable than contact of the head with the entire circumference of the body, as it is possible that there might be inaccuracies in the end of the body when made otherwise. The three-point contact ensures accurate positioning of the mirror, which is of course important. The cover is normally held in its closed position by an appropriate detent, herein a projection 32, which is received in an indentation 33 provided in the flange 19. These parts are sufficiently resilient to permit the projection to be sprung out of the indentation when sufficient force is applied to the cover in a rearward direction.

Figure 4:
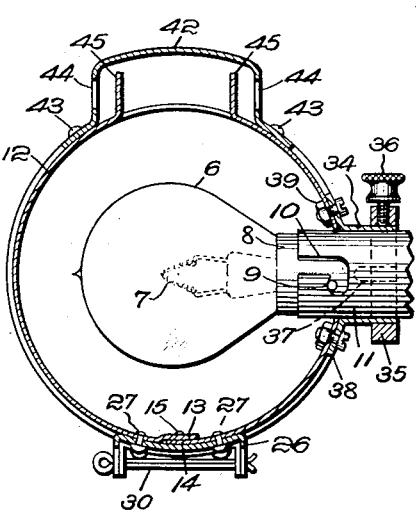
Fig. 4 is a sectional view on line 4—4 of Fig. 1.

It happens that the manufacture of the lamps available for this purpose has not been standardized to the point where the filaments are uniformly placed with relation to the bases of the bulbs. Sometimes, it happens that the filament of one bulb is nearer the base than the filament of another, and sometimes the center of the filament is not axially aligned with the axis of the lamp base. These inaccuracies of manufacture can be compensated for in the present example by various adjustments now to be described. Referring to Fig. 4, the lamp socket is received in a support, herein comprising a tube 34 in which the socket is rather snugly fitted, though capable of being adjusted about and along its axis. Proper adjustment of the socket in the support is normally maintained by the provision of suitable clamping means, herein a collar 35 encircling the tubular support, and carrying a set screw 36 (see Fig. 4), which when screwed against the tubular support tends to press the latter against the enclosed socket. Herein, the tubular support is rendered expansible and contractible by providing the same with two slots 37. By loosening the set screw 36, the lamp may be adjusted either about or along its axis.

Figure 3:
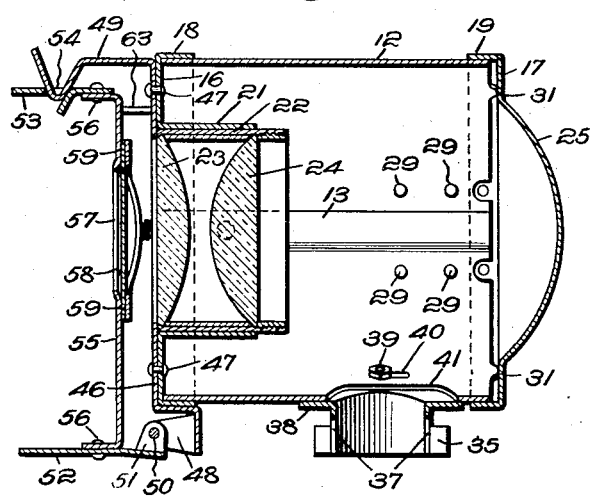
Fig. 3 is a sectional view on line 3—3 of Fig. 1.

The adjustment of the filament with respect to the focal point of the reflector is conveniently accomplished by making the tubular support 34 adjustable lengthwise of the lamp house, as by providing the support with a flange 38 suitably shaped to conform to the external surface of the lamp house, and by providing clamping bolts 39, which extend through the flange and through elongated slots 40 (see Fig. 3). The body of the lamp house is provided with a lateral opening 41, through which the lamp socket extends, and this opening is similarly elongated or made sufficiently large to permit the desired amplitude of adjustment. By simply loosening these bolts, the lamp may be moved forward and backward to obtain the desired focal adjustment, and the bolts are then tightened to maintain the same.

The ventilation of the lamp house is conveniently accomplished by the provision of a hood or cowl 42, applied to the upper portion of the lamp house body by rivets 43, said cowl presenting lateral openings 44 (see Fig. 4), to permit the free passage of air. The escape of light through these openings, however, is prevented by guards 45, conveniently struck up from the metal which forms the body.

The lamp house is carried by a film gate, herein comprising a plate 46 conveniently secured to the front head 16 by rivets 47. This plate is bent to form hinge ears 48, shown at the lower portion of Fig. 3, and a spring latch 49 shown at the upper portion of Fig. 3. The ears are hinged on a pintle 50 on ears 51 presented by a lateral wall 52 on an appropriate support, herein a hollow column whose opposite lateral wall 53 is provided with an opening 54 to receive the spring latch. The column has a rear wall 55, secured as by rivets 56 to the lateral wall, and the rear wall presents an opening 57 for the shaft of light from the condensing lenses.

Figure 2:
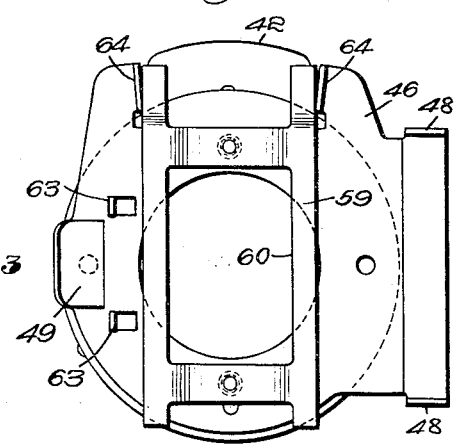
Fig. 2 is an end elevation of the same as viewed from the left-hand side of Fig. 1.

A motion picture film, shown in section at 58 in Fig. 3, is held between a fixed guide presented by the wall 55 and a movable guide, herein a pressure plate 59, which, as best shown in Fig. 2, has an opening 60 for the emission of the beam of light from the lamp house. This plate is attached to the lamp house by headed fastenings, herein screws 61, which extend through the head 16 and through the plate 46, and are threaded into the plate 59. These screws are disposed one above the other in the central plane of the lamp house, and the openings in the latter are sufficiently large to permit considerable rocking movement of the pressure plate accompanying swinging movement of the lamp house. Pressure springs 62, encircling the screws 61, are interposed between the plates 46 and 59. When, therefore, during the closing movement of the gate, the plate 59 contacts at one edge with the film, the plate rocks upon the loose joint presented by the screws, and thereby causes the other edge of the pressure plate to be brought to bear on the other edge of the film. As the closing movement proceeds the angular movement between the pressure plate and the gate changes, and the springs become more and more compressed until finally the latch springs into place, and the film is held under spring pressure, which is equalized between its two margins, owing to the central location of the springs, and the loose connection of the plate with the gate. Closing movement of the gate is positively limited by stops conveniently formed as lugs 63, struck up from the plate 46. These lugs strike against the rear face of the wall 55 of the hollow column, and limit the swinging movement of the gate.

The edges of the film are guided by lateral guides 64, (see Figs. 1 and 2), which are struck up from the plate 46, and between which guides the pressure plate 59 is received, as best shown in Fig. 2. Thus it is apparent that by unlatching and swinging the lamp house in a rearward and lateral direction, the film is freed of all restraint, and may be removed, replaced and adjusted at will.

Having thus described one embodiment of the invention, but without limiting myself thereto, what I claim and desire by Letters Patent to secure is:

1. In a light projector, the combination of a light source having a base; a housing therefor, a concave reflector presenting a removable closure affording access to one end of said housing for inspection and replacement of said light source, a wall at the opposite end of said casing presenting a light emitting opening, a condensing lens system aligned with said reflector, means providing for adjustment of said light source longitudinally of and about an axis transverse to the optical axis of said reflector and said condensing lens system, and means providing for independent adjustment of said light source and its base bodily lengthwise of the optical axis of said reflector, and toward and from the latter.

2. In a light projector, the combination of a light source comprising an incandescent lamp having a filament, a bulb and a base; a socket in which said base is received; a lamp housing within which said lamp is housed; a laterally disposed, socket receiving tube supported by said housing and provided with a slot rendering the same contractible about said socket; a ring loosely disposed about said tube; and a set-screw threaded into said ring, bearing against said tube and adapted to contract the latter about said socket by displacing said tube relatively to said ring, thereby to clamp said socket and said lamp in the selected position of adjustment with relation to the optical axis of the projector.

3. In a motion picture projector, the combination of a hinged lamp house, a film presser carried thereby, comprising a plate presenting an opening for the emission of the beam of light from said lamp house, and pressure springs for urging said plate against the film, said springs presenting adjacent the central portion of said plate a fulcrum providing for a tilting movement of said plate relatively to said lamp house accompanying swinging movement of said lamp house on its hinge.

4. In a motion picture projector, the combination of a lamp house, a support on which said lamp house is hinged, said support presenting a fixed guide for the film, a movable guide carried by said lamp house, comprising a pressure plate presenting a light-emitting opening and a marginal frame about said opening to press the film against said fixed guide, means attaching said plate to said lamp house and presenting adjacent the central portion of said plate a rocking connection therebetween to permit said plate to rock relatively to said lamp house accompanying swinging movement of said lamp house relatively to said support, and spring means interposed between said plate and said lamp house to urge the film against said fixed guide.

5. In a motion picture projector, the combination of a lamp house, a support on which said lamp house is hinged, said support presenting a fixed guide for the film, a movable guide carried by said lamp house, comprising a pressure plate presenting a light-emitting opening and a marginal frame about said opening to press the film against said fixed guide, means attaching said plate to said lamp house and presenting adjacent the central portion of said plate a rocking connection therebetween to permit said plate to rock relatively to said lamp house accompanying swinging movement of said lamp house relatively to said support, spring means interposed between said plate and said lamp house to urge the film against said fixed guide, and guides which embrace and guide the edges of the film and between which guides said plate is disposed.

6. In a light projector for motion picture machines, the combination of a light source, a housing therefor, a fixed support, and a gate secured to said housing hinged to said support and presenting a projecting stop to limit swinging movement of said gate toward said support.

7. In a light projector for motion picture machines, the combination of a light source, a housing therefor, a fixed support, and a gate secured to said housing, presenting a hinge portion hinged on said fixed support, a stop carried by said gate to limit its swinging movement toward said support, and a latch carried by said gate toward and from said support to hold said housing in its normal position.

In testimony whereof, I have signed my name to this specification.

CLARENCE B. HALL.